United States Patent

[11] 3,621,152

[72] Inventor Philip M. Billings
Nashua, N.H.
[21] Appl. No. 879,644
[22] Filed Nov. 25, 1969
[45] Patented Nov. 16, 1971
[73] Assignee Sanders Associates, Inc.
Nashua, NH,

[54] MAGNETIC TAPE STORAGE DEVICE
11 Claims, 2 Drawing Figs.

[52] U.S. Cl. .......... 179/100.2 S, 179/100.2 R, 340/174.1 J
[51] Int. Cl. .......... G11b 5/00
[50] Field of Search .......... 179/100.2 R, 100.2 S; 340/174.1 J, 174.1 C, 172.5; 250/219 Q, 219 FR

[56] References Cited
UNITED STATES PATENTS

| | | | |
|---|---|---|---|
| 2,683,568 | 7/1954 | Lindsay | 179/100.2 S |
| 2,782,398 | 2/1957 | West et al. | 340/174.1 C |
| 3,192,509 | 6/1965 | Durand et al. | 179/100.2 S |
| 3,344,416 | 9/1967 | Harford | 340/174.1 C |

*Primary Examiner*—Robert L. Richardson
*Attorney*—Louis Etlinger

ABSTRACT: A fast access bulk storage device, using magnetic tape, for storage and retrieval of data includes a page-counting circuit which samples and stores actual page location, by detecting translucent portions on the tape denoting beginning of page, and constantly compares it to any given page address entered into the system, and a data buffer stage, comprised of a continuous loop of magnetic tape of approximately one page length, which provides for temporary storage of data while the main storage device is being accessed.

INVENTOR
PHILLIP M. BILLINGS
BY Richard I. Seligman
ATTORNEY

MAGNETIC TAPE STORAGE DEVICE

BACKGROUND OF THE INVENTION

The prior art is replete with electronic storage and retrieval systems. However, these systems are expensive and complex. Many of them require a computer which should not be necessary in applications for storage and retrieval of data without processing.

There are in the prior art magnetic tape storage and retrieval devices, however, these generally are very costly and complex. They either employ a separate track for selecting the addressed page of data or employ a head to read the addresses on the data tracks themselves. For fast access of the data, it is necessary that means be provided for alignment of the heads and tape wherein the relative motion between the two will not cause excessive wear of the tape. For example, one method is to float the tape in air over the heads. All these methods are extremely costly and therefore unsuitable for many applications.

SUMMARY OF THE INVENTION

Accordingly, it is an object of this invention to provide a device for low-cost fast-access bulk storage of data.

It is another object of this invention to provide for electronic storage and retrieval of data without the need of a computer.

It is a further object of this invention to provide for automatic storage and retrieval of data by page number.

It is yet another object of this invention to provide a page-counting circuit which includes a photocell sensor for detecting translucent sections of tape.

It is a still further object of this invention to provide a magnetic tape having translucent sections at predetermined distances thereon.

Briefly, a fast-access bulk storage device is provided comprising a reel-to-reel tape recorder having wound thereon a special magnetic tape with translucent section for denoting the beginning of each page. Means are provided for detecting the translucent portions, for counting same, for comparing same to addresses entered into the system and for providing instructions to the recorder to advance or rewind in accordance with the comparison. Also provided is a one page buffer tape for temporary storage of data while the recorder is being accessed.

BRIEF DESCRIPTION OF THE DRAWINGS

The above-mentioned and other features and objects of this invention will become more apparent by reference to the following description taken in conjunction with the accompanying drawings, in which.

DESCRIPTION OF A PREFERRED EMBODIMENT

Figure 1:
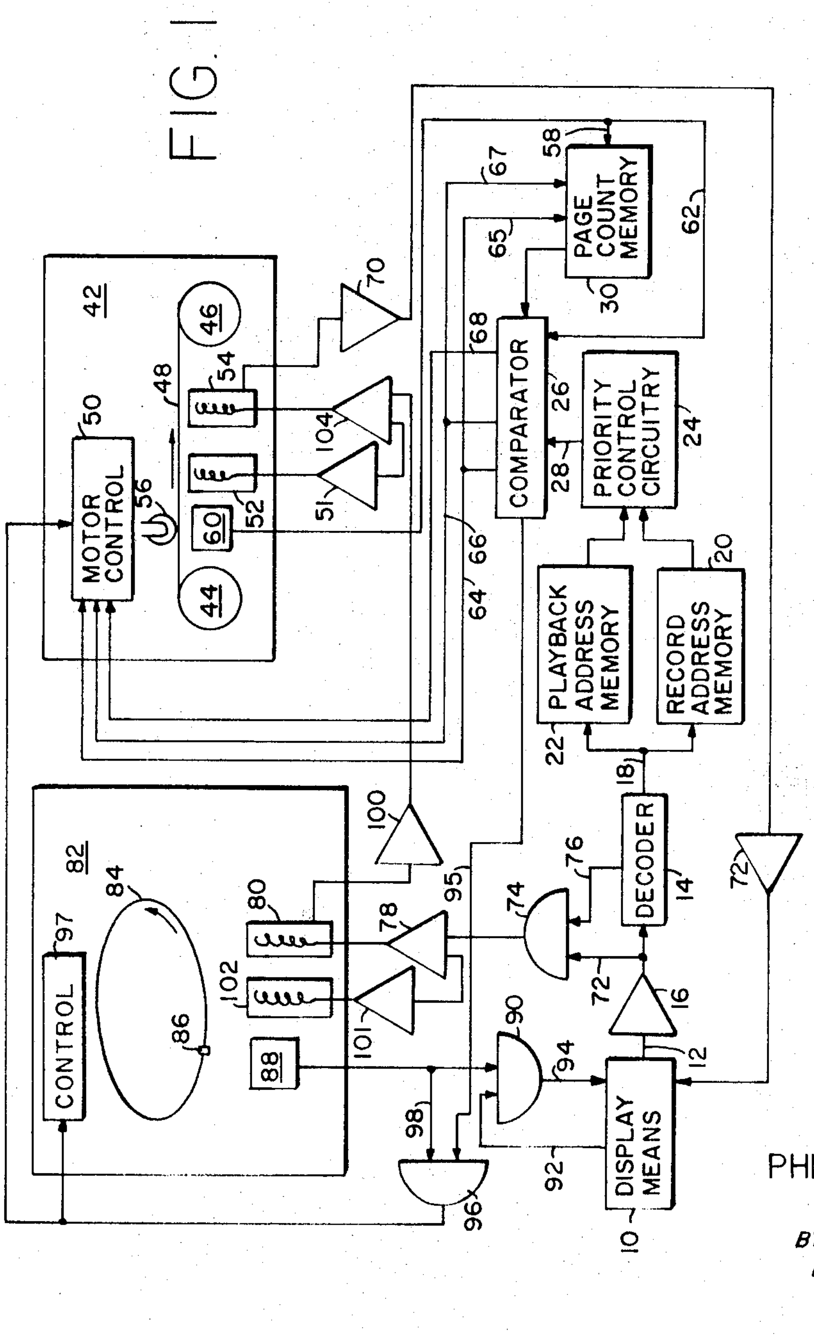
FIG. 1 is a block diagram of a preferred embodiment of the invention.

Referring now to FIG. 1, there is illustrated in block diagram format one embodiment of the present invention. This embodiment provides for use of the invention with a display system for recording on the tape of a recorder what is displayed on the display system and for playing back what is recorded on tape to be displayed on the display system for display and/or editing purposes.

The display means can comprise, for example, a cathode-ray tube having a keyboard input/output device or a teletype machine or any other device which displays information.

The data output from a display device 10 is coupled via a line 12 to a decoder 14 using a conventional line driver amplifier 16. The data is supplied to a decoder 14 in serial fashion. The data output at line 12 can merely be an address punched into, for example, a keyboard, the address signifying a page of recorded information which is to be played back and displayed on the display means, a page being defined as a length or section of tape which represents a page of data. It is not necessary that each page of tape be of equal length. Alternatively, the data output on line 12 can be the data which is displayed on display means 10, for example, a page of information which is to be recorded on magnetic tape.

In the present embodiment, decoder 14 is a conventional decoder of ordinary logic circuitry and can be constructed in many ways as is well known to those skilled in the art. Decoder 14 initially searched for a start-of-message coded signal after which it will look for a code signifying an address. The address will be either a playback address or a record address. In the embodiment illustrated, a record address is signified by three consecutive numerics, the three numerics designating the page of magnetic tape on which data is to be recorded. A playback address is signified by three consecutive numerics followed by a colon, the three numerics designating the page of magnetic tape on which data is to be reproduced for display and/or editing purposes. For playback, the addresses are, for example, typed onto a keyboard display. Page one would be typed as 001, page 10 would be 010, etc.

The output from decoder 14 is applied via a line 18 to a record address memory 20 and to a playback address memory 22; that is, the address, whether a record address or a playback address, is loaded into both of the memories 20, 22. In the event that the address is a record address, as signified by the absence of a colon following the three numerics, a carriage return signal following the address will disable the clear lines of the record address memory 20. If the address is a playback address, as signified by a colon following the three numerics, the clear lines in the record memory will be enabled and the data in the record address memory 20 cleared. In the embodiment illustrated, record address memory 20 can store only one address at any one time while playback address memory 22 can store a number of addresses. In this embodiment, the memories are preferably shift registers.

After entering page numbers into the playback address register, any sequence of $n$ pages (depending on the storage capability of the register) can be reproduced by clearing the display 10 causing automatic reproduction of the next stored page as the priority control circuit 24 applies this stored address to comparator 26.

The memories 20 and 22 are coupled to a priority control circuit 24, comprising logic gates, which looks to both memories and, if addresses are stored in both memories, selects the record address first.

The selected address is applied to a comparator 26 via a line 28 the outputs for which instruct a motor control circuit 50 of a recorder 42 to advance or rewind. Comparator 26 has a second input thereto an output from a page count memory 30. Page count memory 30, in this embodiment, comprises a forward and backward counter which has stored therein the page at which the tape of recorder 42 is currently set. Page count memory 30 is initially set to zero when the recorder is loaded. It then counts forward or backward to the current page at which the recorder is set.

Figure 2:
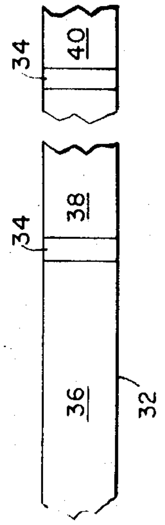
FIG. 2 is a sketch illustrating a portion of magnetic tape used in the recorder of the embodiment of FIG. 1.

At this time, some knowledge of the recorder used is necessary for an understanding of the invention. The recorder is a reel-to-reel recorder and has a unique tape wound thereon. The tape comprises one or more tracks of magnetic tape with a translucent band across the tape at the portions thereof designating the beginning of each page (see FIG. 2 which illustrates a single track tape only). This tape 32, which is shown in part, is conventional magnetic tape with the emulsion or magnetic material scraped off at the portion thereof designating the beginning of each page, thereby providing translucent sections 34. In the portion illustrated, section 36 of the tape is, for example, page $n$. Section 38 of the tape then would be page $u$+1, with the beginning of page $n+1$ or section 38 preceded by a translucent section 34. In like fashion, section 40 of the tape which would be page $n+2$ is preceded by another translucent section 34. The recorder used in the reduction of the practice of the preferred embodiment is a Viking model 35 tape cartridge handler and a Viking model 230 reel-to-reel tape transport with both units modified for digital recording techniques. This invention is also particularly applicable for use with cassette recorders.

The tape recorder is illustrated in FIG. 1 by block 42 and comprises reels 44 and 46 having a magnetic tape 48 wound thereon. The motor control circuit for the tape recorder is illustrated by block 50. Recorder 42 has three motors a low-speed motor for record and playback and two high-speed reel motors for positioning the tape to the designated pages. As an example, the low-speed motor runs the tape at 7.5 inches per second and the high-speed motor at 1,600 feet per minute. An erase head 52 and a record/playback head 54 is shown positioned adjacent tape 48. Also positioned in proximity to the tape is a lamp 56 and a photocell sensor 60 which is used to detect translucent sections 34. An output from photocell sensor 60 is applied to page count memory 30 via line 58 and causes same to count. The output from photocell sensor 60 is also applied to comparator 26 via a line 62 to signify that the tape is positioned at a translucent section. If multiple track tapes are used, a track detector (not shown) is also required.

Comparator 26, thus, compares the count within page count memory 30 and the address within record address memory 20 or playback address memory 22, and provides outputs to the reel-to-reel recorder motor control 50. Output 64 from the comparator directs the motor control to advance the tape. Output 66 directs the motor control to rewind the tape, and output 68 directs the motor control to stop. These outputs from the comparator 26 are employed by the motor control circuit to operate the fast forward and rewind motor. Comparator 26 is further logically designed so that after reaching a specific page, it will direct the motor control to back up to a translucent portion. Output 62 from the photocell sensor provides the translucent portion indication to the comparator. Outputs 64 and 66 from comparator 26 are also applied to page count memory 30 via lines 65 and 67 so that the counter will be instructed in which direction to count.

The outputs from comparator 26, thus, instructs the high-speed motor of the reel-to-reel recorder 42 not to run, that is, stay at the page it is currently set to when the inputs to the comparator from an address memory and from page count memory 30 are equal. When the number input at line 28 is greater than the count stored in page count memory 30, reel-to-reel recorder will advance, and when the number input at line 28 is less than the count stored in page count memory 30, reel-to-reel recorder will rewind.

If a playback address has been entered into comparator 26, then, when the reel-to-reel recorder reaches the addressed page, the recorded material thereon will be read out via a playback amplifier 70 and a line amplifier or receiver 72 to the display means for display thereon. The information can be observed on the display means, can be photographed in the event the display means is a cathode-ray display, or can be edited via a keyboard attached to the cathode ray display. Often, displayed information will be edited and then rerecorded onto the tape.

In the record mode of operation, the address of the page on which information is to be recorded is applied at output 12 to decoder 14 whereupon it is stored in the record address memory 20 and passed on to the comparator 26 where it is compared with the count stored in page count memory 30 and the fast motor of the reel-to-reel recorder caused to advance or rewind the tape to the proper page. At the same time, the information on line 12 is passed via a line 72 to one input of an AND-gate 74. The second input or enabling input to AND-gate 74, input 76, is an output from decoder 14 which signifies reception of the start-of-message code. AND-gate 74 is disabled by an end-of-message code. The input from line 72 contains the address as well as the data to be recorded and is applied via a record amplifier 78 to a record/playback head 80 of a loop recorder 82.

Loop recorder 80 provides for temporary storage of the data by recording on a single continuous loop of tape 84 which contains approximately 10 seconds of tape equivalent to a single page of data. Tape loop 84 runs continuously as long as primary power is supplied to the recorder. The continuous loop of tape 84 is in effect a one page buffer. Alternatively, a delay line memory or other device can be substituted therefor. Tape 84 of loop recorder 82 has arranged thereon a metal splice 86 which acts in conjunction with a metal detector 88 which detects the presence of metal splice 86 and applies a signal as one input to an AND-gate 90. In this embodiment, a rudimentary metal detector is used which comprises two pieces of metal separated by insulation which two pieces are electrically joined when the metal splice passes over the detector. AND-gate 90 has a second input thereto an output from display means 10 via line 92 which carries the send page instruction from the display means 10. The output of AND-gate 90 via line 94 enables the display to output its data. This insures that the display will not output its data until the loop of the recorder is at the beginning thereof. After the page of information has been recorded on tape 84, AND-gate 74 will be disabled by the end-of-message decode from decoder 14 ceasing further recording. Thus, the data output is recorded on the tape 84, and remains there while the reel-to-reel recorder 42 is advancing or rewinding the tape to the addressed page.

When the addressed page is reached, an output via line 95 from comparator 26 is applied as one input to an AND-gate 96. The second input to AND-gate 96 is a signal from the output of metal detector 88 via a line 98. The output from AND-gate 96 is applied to the control circuitry 97 of loop recorder 82 which causes the information recorded on loop 84 to be read out via a playback amplifier 100. An erase head 102 and an erase oscillator 101 for loop recorder 82 serve the conventional function. The information read out of playback amplifier 100 is applied to record amplifier 104 and to record head 54 of the reel-to-reel recorder whereby it is recorded on the tape thereof. Erase head 52 and erase oscillator 51 for recorder 42 serve the conventional function. The output from AND-gate 96 is also applied via a line 106 to the motor control 50 of recorder 42 to cause the tape to advance at recording speed. The memories and sequential control are operated by a system clock control (not shown) in conventional fashion.

While I have described above the principles of my invention in connection with specific apparatus, it is to be understood that the specification is presented by way of example and not as a limitation of the scope of my invention, as set forth in the accompanying claims.

I claim:

1. Magnetic tape storage apparatus, comprising:
a tape recorder including a magnetic tape having means thereon for denoting the beginning of a page;
means for detecting said page denoting means;
counting means coupled to said detecting means;
means for comparing the count of said counting means with a predetermined page number;
means for causing said tape to move to said predetermined page,
a buffer storage device;
data input means;
means for storing in said buffer storage device data to be recorded; and
means for recording said data stored in said buffer storage device on said magnetic tape subsequent to said tape moving to said predetermined page.

2. Magnetic tape storage apparatus as defined in claim 1, wherein said page-denoting means includes translucent sections arranged at predetermined locations along said magnetic tape.

3. Magnetic tape storage apparatus as defined in claim 2, wherein said detecting means includes a photocell sensor for detecting said translucent sections.

4. Magnetic tape storage apparatus as defined in claim 3, wherein said detecting means further includes a light source positioned one side of said magnetic tape, said photocell sensor being positioned the other side of said magnetic tape.

5. Magnetic tape storage apparatus as defined in claim 1, wherein said tape recorder includes a slow speed recording motor and a high-speed access motor.

6. Magnetic tape storage apparatus as defined in claim 5, wherein said means for causing said tape to move to said predetermined page includes means for coupling said comparison means to high-speed access motor.

7. Magnetic tape storage apparatus as defined in claim 1, wherein said buffer storage device comprises a second tape recorder.

8. Magnetic tape storage apparatus as defined in claim 7, said second tape recorder including a continuous loop of magnetic tape of sufficient length to store approximately one page of data.

9. Magnetic tape storage apparatus as defined in claim 8, said continuous loop tape having a metal splice thereon indicating the beginning of said loop.

10. Magnetic tape storage apparatus as defined in claim 9, further including a metal detector for detecting said metal splice.

11. Magnetic tape storage apparatus as defined in claim 10, wherein said means for recording said data stored in said buffer includes means for detecting that said tape has moved to said predetermined page and that said continuous loop is at the beginning thereof.

* * * * *